(12) United States Patent
Gao

(10) Patent No.: US 12,501,448 B2
(45) Date of Patent: Dec. 16, 2025

(54) METHOD FOR DETERMINING FEEDBACK INFORMATION TRANSMISSION LOCATION AND DEVICE

(71) Applicant: DATANG MOBILE COMMUNICATIONS EQUIPMENT CO., LTD., Beijing (CN)

(72) Inventor: Xuejuan Gao, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 459 days.

(21) Appl. No.: 17/925,431

(22) PCT Filed: Mar. 9, 2021

(86) PCT No.: PCT/CN2021/079824
§ 371 (c)(1),
(2) Date: Nov. 15, 2022

(87) PCT Pub. No.: WO2021/227624
PCT Pub. Date: Nov. 18, 2021

(65) Prior Publication Data
US 2023/0189287 A1 Jun. 15, 2023

(30) Foreign Application Priority Data
May 15, 2020 (CN) .......................... 202010414649.3

(51) Int. Cl.
*H04W 72/232* (2023.01)
*H04L 1/1812* (2023.01)
(Continued)

(52) U.S. Cl.
CPC ......... *H04W 72/232* (2023.01); *H04L 1/1812* (2013.01); *H04L 5/0048* (2013.01); *H04W 72/11* (2023.01)

(58) Field of Classification Search
CPC ... H04W 72/232; H04W 72/11; H04L 1/1812; H04L 5/0048
(Continued)

(56) References Cited

U.S. PATENT DOCUMENTS

2016/0212734 A1* 7/2016 He .............................. H04L 5/14
2018/0249458 A1 8/2018 He et al.
(Continued)

FOREIGN PATENT DOCUMENTS

CN 107925532 A 4/2018
CN 110943805 A 3/2020
(Continued)

OTHER PUBLICATIONS

Catt, "Discussion on HARQ-ACK codebook determination with BWP switch," 3GPP TSG RAN WG1 Meting #98bis, R1-1910312, Chongqing, China, Oct. 14-20, 2019.
(Continued)

*Primary Examiner* — Chi Tang P Cheng
(74) *Attorney, Agent, or Firm* — Meunier Carlin & Curfman LLC

(57) ABSTRACT

Provided in the present application are a method for determining a feedback information transmission location and a device, used when one piece of DCI simultaneously indicates resource release with respect to SPS PDSCHs on a plurality of carrier waves, to implement determining a location of an HARQ-ACK for the DCI in an HARQ-ACK codebook. A method of the present application comprises: Determining that a DCI indicates performing resource release with respect to SPS PDSCHs on a plurality of carrier waves; determining a target location of an HARQ-ACK corresponding to the DCI in an HARQ-ACK codebook according to an SLIV for a first SPS PDSCH among released SPS PDSCHs, wherein the first SPS PDSCH is an SPS PDSCH on a target carrier wave among the plurality of carrier waves. Normal feedback of the HARQ-ACK for the DCI is ensured, and uniform understanding for HARQ-ACK transmission by a network-side device and a terminal ensures normal transmission of the HARQ-ACK.

17 Claims, 10 Drawing Sheets

(51) Int. Cl.
*H04L 5/00* (2006.01)
*H04W 72/11* (2023.01)

(58) Field of Classification Search
USPC .......................................... 370/329
See application file for complete search history.

(56) References Cited

U.S. PATENT DOCUMENTS

| 2019/0037586 | A1 | 1/2019 | Park et al. |
| 2020/0106566 | A1 | 4/2020 | Yeo et al. |
| 2020/0213981 | A1* | 7/2020 | Park .............. H04W 72/23 |
| 2021/0314094 | A1 | 10/2021 | Gao |
| 2021/0314100 | A1 | 10/2021 | Yeo et al. |

FOREIGN PATENT DOCUMENTS

| WO | 2020032490 A1 | 2/2020 |
| WO | 2020057566 A1 | 3/2020 |

OTHER PUBLICATIONS

Catt, "Draft CR to 38.213 correcting Type 1 HARQ-ACK codebook determination," 3GPP TSG-RAN 1 Meeting #95, R1-18xxxxx, Spokane, USA, Nov. 12-16, 2018.
Ericsson. "Scheduling/HARQ Enhancements for NR URLLC" 3GPP TSG-RA1V WGJ Meeting #99 RI-1911948, Nov. 9, 2019, 9 pages.

\* cited by examiner

METHOD FOR DETERMINING FEEDBACK INFORMATION TRANSMISSION LOCATION AND DEVICE

CROSS REFERENCE TO RELATED APPLICATIONS

The present application is a US National Stage of International Application No. PCT/CN2021/079824, filed on Mar. 9, 2021, which claims priority to Chinese patent application No. 202010414649.3, entitled "METHOD FOR DETERMINING FEEDBACK INFORMATION TRANSMISSION LOCATION AND DEVICE", and filed to China Patent Office on May 15, 2020, the entire contents of which are incorporated herein by reference.

FIELD

The present application relates to the technical field of wireless communication, in particular to a method and device for determining a feedback information transmission location.

BACKGROUND

In a new radio (NR) technology, for downlink transmission, corresponding hybrid automatic repeat request (HARQ) acknowledge (including feedback of acknowledge ACK and non-acknowledge NACK needs to be performed, in this application, for the convenience of description, HARQ-ACK is uniformly adopted to represent the hybrid automatic repeat request acknowledge information). HARQ-ACK transmission may adopt two kinds of a semi-static HARQ-ACK codebook and a dynamic HARQ-ACK codebook.

In an NR release (Rel-15 for short), only one piece of downlink control information (DCI) is supported to indicate release of a semi-persistent scheduling (SPS) physical downlink shared channel (PDSCH) on a carrier for DCI transmission. In NR Rel-16, one piece of DCI is supported to release one or more SPS PDSCHs on a carrier, where the carrier on which the released SPS PDSCHs are located may be the same as or different from the carrier for the DCI transmission. However, Rel-15 and Rel-16 both only support one piece of DCI to release the SPS PDSCH on one carrier. An SPS PDSCH corresponds to an SPS configuration, transmission information of the SPS PDSCH is determined according to transmission parameters corresponding to the SPS configuration, such as time-frequency domain resources, a modulation and coding scheme (MCS), a pilot frequency configuration, and a port. The DCI for indicating SPS PDSCH release may also be called a physical downlink control channel (PDCCH, also known as SPS PDSCH release) for indicating SPS resource release, the PDCCH is a specific channel for transmitting the DCI, and the DCI is a format used for PDCCH transmission, and the two may be considered as equivalent. The PDCCH/DCI for indicating SPS PDSCHs release needs to be fed back with HARQ-ACK, so as to inform a base station of whether an operation of the SPS resource release is successful on a terminal side. In a design of the semi-static HARQ-ACK codebook, only the method of how to perform HARQ-ACK feedback on the DCI for indicating the SPS PDSCHs release in the above-mentioned case where one piece of DCI indicates SPS PDSCHs release on a carrier is considered.

In order to improve a scheduling efficiency and reduce DCI overhead, it may be necessary to consider adopting one piece of DCI to schedule a plurality of carriers. In addition to transmitting PDSCHs on the plurality of carriers through scheduling by one piece of DCI, when SPS configurations exist on the plurality of carriers, one piece of DCI may further indicate SPS PDSCHs release on the plurality of carriers. In this case, there is no clear method for how to perform HARQ-ACK feedback on the DCI for indicating SPS PDSCHs release on the plurality of carriers.

SUMMARY

Embodiments of the present application provide a method and device for determining a feedback information transmission location, so that when one piece of DCI simultaneously indicates SPS PDSCHs release on a plurality of carriers, a location of an HARQ-ACK for the DCI in an HARQ-ACK codebook is determined.

In a first aspect, an embodiment of the present application provides a method for determining a feedback information transmission location, including:
  determining that DCI indicates SPS PDSCHs release on a plurality of carriers; and
  determining a target location of an HARQ-ACK corresponding to the DCI for indicating SPS PDSCHs release in an HARQ-ACK codebook according to a start and length indicator value (SLIV) for a first SPS PDSCH among the released SPS PDSCHs, where the first SPS PDSCH is an SPS PDSCH on a target carrier among the plurality of carriers indicated by the DCI to release SPS.

In the present application, when it is determined that DCI indicates SPS PDSCHs release on the plurality of carriers, a target location of an HARQ-ACK corresponding to the DCI in the HARQ-ACK codebook is determined according to the SLIV for the first SPS PDSCH among the released SPS PDSCHs, and the first SPS PDSCH is an SPS PDSCH on a target carrier among the plurality of carriers. The application provides a method of how to determine the location of the HARQ-ACK for the DCI in the HARQ-ACK codebook when one piece of DCI simultaneously indicates to release the SPS PDSCHs on the plurality of carriers. Normal feedback of the HARQ-ACK for the DCI is ensured when one piece of DCI indicates to release the SPS PDSCHs on the plurality of carriers, uniform understanding for HARQ-ACK transmission by a network-side device and a terminal is ensured, and normal transmission of the HARQ-ACK is ensured.

In a possible implementation, the target carrier includes:
  a carrier in which the DCI is transmitted; or
  a carrier with a largest carrier index among the plurality of carriers; or
  a carrier with a smallest carrier index among the plurality of carriers; or
  each of the plurality of carriers.

In a possible implementation, the determining the target location of the HARQ-ACK corresponding to the DCI in the HARQ-ACK codebook according to the SLIV for the first SPS PDSCH among the released SPS PDSCHs, further includes:
  determining the target location of the HARQ-ACK corresponding to the DCI in the HARQ-ACK codebook according to a first time unit of the target carrier, where the first time unit is a first or last time unit or each time unit among time units overlapping with the DCI; or
  determining the target location of the HARQ-ACK corresponding to the DCI in the HARQ-ACK codebook according to a second time unit of the target carrier, where the second time unit is a first or last time unit or each time unit among time units overlapping with a time unit in which the DCI is transmitted.

In a possible implementation, each of the time units includes a predefined time period, or a subframe, or a slot, or a sub-slot composed of N symbols; and N is a positive integer.

In a possible implementation, when there are a plurality of released SPS PDSCHs on the target carrier, the first SPS PDSCH is an SPS PDSCH with a smallest SPS configuration index among the plurality of released SPS PDSCHs on the target carrier.

In a possible implementation, the HARQ-ACK codebook is a semi-static HARQ-ACK codebook.

In a second aspect, an embodiment of the present application provides a device for determining a feedback information transmission location, including: a processor and a memory; where the processor is configured to read a program in the memory and execute:
 determining that DCI indicates SPS PDSCHs release on a plurality of carriers; and
 determining a target location of an HARQ-ACK corresponding to the DCI in an HARQ-ACK codebook according to an SLIV for a first SPS PDSCH among released SPS PDSCHs, where the first SPS PDSCH is an SPS PDSCH on a target carrier among the plurality of carriers.

In a possible implementation, the target carrier includes:
 a carrier in which the DCI is transmitted; or
 a carrier with a largest carrier index among the plurality of carriers; or
 a carrier with a smallest carrier index among the plurality of carriers; or
 each of the plurality of carriers.

In a possible implementation, the processor is further configured to:
 determine the target location of the HARQ-ACK corresponding to the DCI in the HARQ-ACK codebook according to a first time unit of the target carrier, wherein the first time unit is a first or last time unit or each time unit among time units overlapping with the DCI; or
 determine the target location of the HARQ-ACK corresponding to the DCI in the HARQ-ACK codebook according to a second time unit of the target carrier, wherein the second time unit is a first or last time unit or each time unit among time units overlapping with a time unit in which the DCI is transmitted.

In a possible implementation, each of the time units includes a predefined time period, or a subframe, or a slot, or a sub-slot composed of N symbols, and N is a positive integer.

In a possible implementation, when there are a plurality of released SPS PDSCHs on the target carrier, the first SPS PDSCH is an SPS PDSCH with a smallest SPS configuration index among the plurality of released SPS PDSCHs on the target carrier.

In a possible implementation, the HARQ-ACK codebook is a semi-static HARQ-ACK codebook.

In a third aspect, an embodiment of the present application provides a device for determining a feedback information transmission location, including: a first determining module and a second determining module; where
 the first determining module is configured to determine that DCI indicates SPS PDSCHs release on a plurality of carriers; and
 the second determining module is configured to determine a target location of an HARQ-ACK corresponding to the DCI in an HARQ-ACK codebook according to an SLIV for a first SPS PDSCH among released SPS PDSCHs, where the first SPS PDSCH is an SPS PDSCH on a target carrier among the plurality of carriers.

In a fourth aspect, an embodiment of the present application provides a computer storage medium, storing a computer program thereon, where the program implements the solution of the first aspect when executed by a processor.

In addition, the technical effects brought by any implementation in the second aspect to the fourth aspect may refer to the technical effects brought by different implementations in the first aspect, which are not repeated here.

BRIEF DESCRIPTION OF THE DRAWINGS

In order to explain technical solutions in embodiments of the present application more clearly, the following will briefly introduce the accompanying drawings that need to be used in the description of the embodiments. Apparently, the accompanying drawings in the following description are only some embodiments of the present application, and for those of ordinary skill in the art, on the premise of no creative labor, other accompanying drawings can be further obtained according to these accompanying drawings.

DETAILED DESCRIPTION OF THE EMBODIMENTS

Part of terms in embodiments of the present application are explained below so as to be understood by those skilled in the art.

(1) In the embodiments of the present application, nouns "network" and "system" are often alternately used, but those skilled in the art may understand their meanings.

(2) The term "a plurality of" in the embodiments of the present application means two or more, and other quantifiers are similar to it.

(3) "And/or" describes the association relationship of associated objects, which means that there can be three kinds of relationships, for example, A and/or B can mean that there are three kinds of situations: A alone, A and B at the same time, and B alone. The character "/" universally indicates that associated objects are in an "or" relationship.

The technical solutions in the embodiments of the present application will be clearly and completely described below with reference to the accompanying drawings in the embodiments of the present application. Apparently, the described embodiments are only a part of the embodiments of the present application, not all of the embodiments. Based on the embodiments in the present application, all other embodiments obtained by those of ordinary skill in the art without creative efforts shall fall within the protection scope of the present application.

Figure 1:
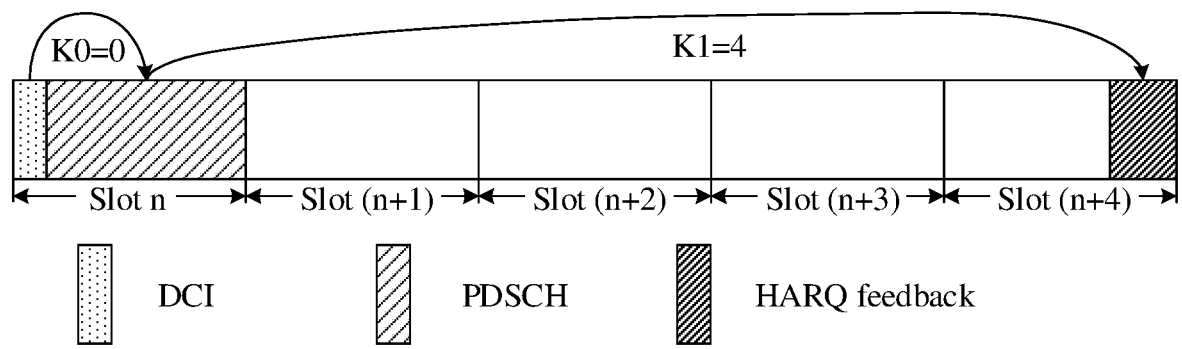
FIG. 1 is a schematic diagram of a downlink scheduling timing sequence and an HARQ-ACK feedback timing sequence provided by an embodiment of the present application.

A new wireless communication system (namely 5 Generation New RAT, 5G NR) supports flexible timing relationships. For a PDSCH, a PDCCH carrying its scheduling information indicates a scheduling timing relationship (scheduling timing, namely K0) between the PDSCH and the PDCCH and a feedback timing relationship (HARQ-ACK timing, namely K1) between the PDSCH and its corresponding HARQ-ACK. Specifically, a time domain resource allocation indication field in a DCI format used by the PDCCH indicates a slot offset K0 between a slot in which the PDSCH is transmitted and a slot in which the DCI is transmitted; and a PDSCH to HARQ-ACK feedback timing indication field in the DCI format indicates the quantity K1 of slots from an end slot of the PDSCH transmission to a start slot of the HARQ-ACK transmission, that is, the PDSCH transmission in a slot n corresponds to HARQ-ACK transmission in a slot (n+K1), as shown in FIG. 1. A complete set of K1 is {0,1,2,3,4,5,6,7,8,9,10,11,12,13,14,15}, which is usually configured with up to 8 values for a terminal. In Rel-15, the K1 value is in the unit of slot, that is, K1=1 represents an interval of 1 slot. In Rel-16, the K1 value may be in the unit of slot or sub-slot, where the sub-slot may be pre-configured as 2 symbol lengths (that is, 7 sub-slots exist in sequence in a slot), or 7 symbol lengths (that is, 2 sub-slots exist in sequence in a slot).

Figure 2:
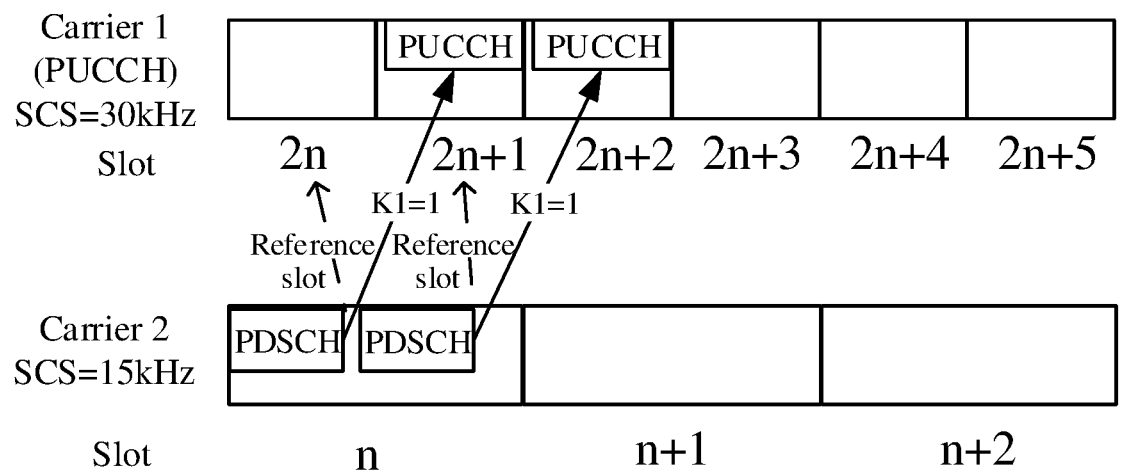
FIG. 2 is a schematic diagram of determining a PUCCH slot on which an HARQ-ACK is transmitted provided by an embodiment of the present application.
Figure 3:
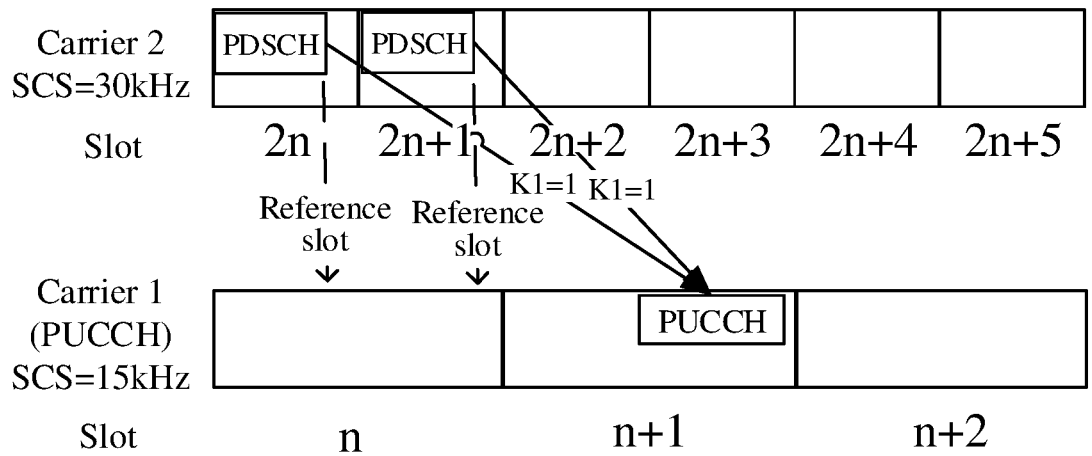
FIG. 3 is a schematic diagram of determining a PUCCH slot on which an HARQ-ACK is transmitted provided by an embodiment of the present application.

When one piece of DCI indicates SPS resource release (or a PDCCH indicates downlink SPS resource release), or one piece of DCI (PDCCH) indicates SPS PDSCH release, in order to inform a base station of whether SPS PDSCHs release is successful, the terminal also needs to perform HARQ-ACK feedback for the DCI (PDCCH) indicating downlink SPS resource release or SPS PDSCH release (SPS PDSCH release is equivalent to the DCI or PDCCH indicating SPS resource release). Specifically, for SPS PDSCH release transmitted in slot n, firstly a last physical uplink control channel (PUCCH) slot (namely a slot determined by an SCS (sub-carrier space) on a carrier in which PUCCH is transmitted) overlapping with the SPS PDSCH release, is found as a reference, the reference slot is taken as a reference point when K1=0, and a PUCCH slot in which HARQ-ACK is transmitted is further determined according to the K1 value. As shown in FIG. 2 and FIG. 3, a PDSCH is taken as an example in the figures, and a similar way can be adopted when the PDSCH is replaced with SPS PDSCH release, except that when there is a PDSCH-to-HARQ_feedback timing indication field in the DCI, the K1 value is from the indication field in the own DCI for the SPS PDSCH release.

The 5G NR system supports two HARQ-ACK codebook generation modes, i.e., the semi-static mode and the dynamic mode. The so-called HARQ-ACK codebook refers to an HARQ-ACK feedback sequence generated for the downlink transmission (including a PDSCH and a PDCCH indicating downlink SPS resource release, where the PDCCH indicating the downlink SPS resource release may also be called SPS release PDCCH or SPS PDSCH release) for which HARQ-ACK feedback is performed on the same time domain location or an uplink channel.

The semi-static codebook may determine a location set Mc (including one or more slots for which HARQ-ACK feedback may be performed in the current slot or sub-slot according to the K1 value in the K1 set, and one or more possible downlink transmission occasions in each slot, where a set of the downlink transmission occasions in these slots constitutes the set Mc) of downlink transmission for which HARQ-ACK feedback is transmitted in a slot or sub-slot n on each carrier c (specifically, on a currently active bandwidth part (BWP) on the carrier) according to an HARQ-ACK timing value in the K1 set, and then the HARQ-ACK codebook transmitted in the slot or sub-slot n may be determined according to the Mc.

Figure 4:
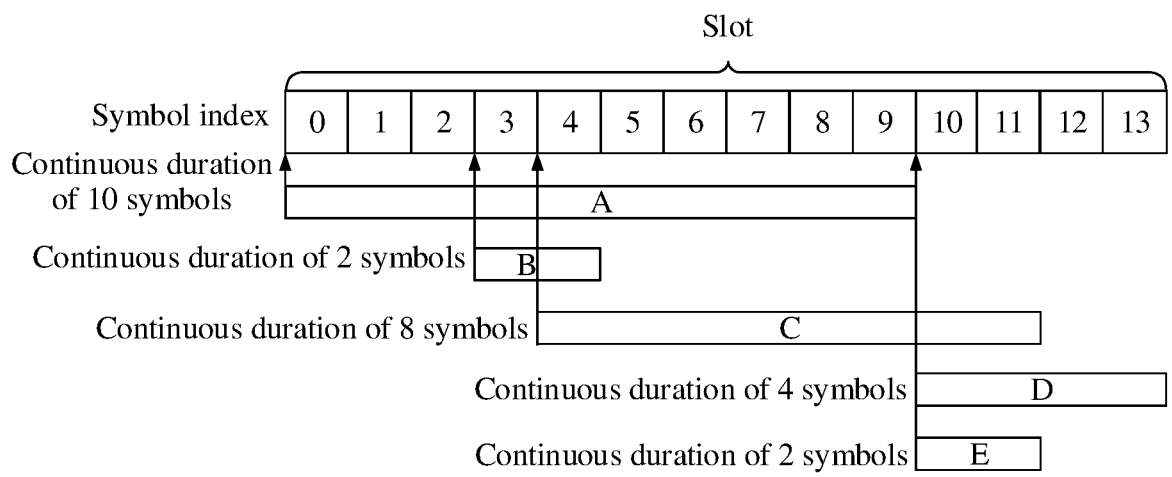
FIG. 4 is a schematic diagram of determining a downlink transmission occasion in a slot according to a TDRA table provided by an embodiment of the present application.
Figure 5:
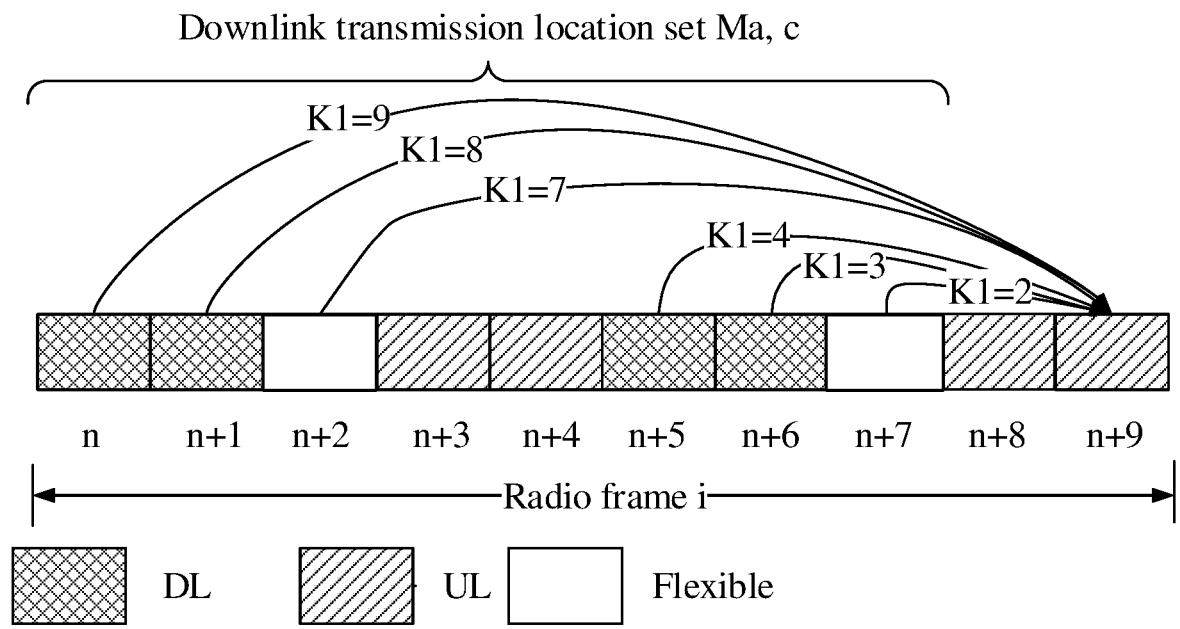
FIG. 5 is a schematic diagram of determining a $M_{A,C}$ set of a corresponding HARQ-ACK fed back in a slot (n+9) if a K1 set is {2,3,4,5,6,7,8,9} provided by an embodiment of the present application.

Specifically, taking a case of a PUCCH transmitted based on a slot as an example, for each carrier c, according to each K1 value in the K1 set, a slot set D for which the HARQ-ACK feedback is correspondingly performed in a slot n is determined. In each slot in the slot set, further according to various time domain locations (one time domain location may be called a starting and length information value (SLIV), and represents a combination of a starting symbol and the quantity of transmission symbols) in a pre-configured downlink time domain resource allocation (TDRA) table or set (each row in the table represents a time domain scheduling case, and information such as starting symbols, the quantity of symbols and a scheduling timing sequence (namely the slot interval number K0 between the PDCCH and the scheduled PDSCH) may be provided), the quantity of downlink transmission occasions that may exist in time division multiplexing (TDM) in a slot is determined. If the terminal does not support receiving more than one unicast PDSCH in a slot, it is determined that a slot corresponds to a downlink transmission occasion; and if the terminal supports receiving more than one unicast PDSCH in a slot, SLIV grouping may be performed based on a predetermined rule according to an SLIV set in the TDRA table, so as to find a first SLIV with an earliest end location. This SLIV is taken as a reference, all SLIVs with start locations before the end location of this SLIV are found, and these SLIVs are taken as a group to correspond to a possible downlink transmission occasion (this is because the overlapping SLIVs are only used to provide a scheduling flexibility, only one SLIV may be selected for use in the actual scheduling, and the overlapping SLIVs will not be used for scheduling two PDSCHs at the same time). Then these SLIVs are removed from the SLIV set, the above steps are repeated for the remaining SLIVs until all SLIVs included in the TDRA table are processed, so as to obtain one or more downlink transmission occasions (downlink transmissions at these locations do not overlap). As shown in FIG. 4, the obtained results are that elements A/B/C are a group corresponding to a downlink transmission location, elements D/E are a group corresponding to a downlink transmission location, and a total of two downlink transmission locations are obtained. Further, before determining the quantity of the downlink transmission occasions, if a semi-static uplink and downlink slot structure is configured, and if there are uplink symbols (uplink symbols indicated by higher layer signaling that configures the slot structure) in a symbol set included in an SLIV in a slot, the downlink transmission may not actually occur due to uplink and downlink resource conflicts, so the SLIV may be removed from the SLIV set. If symbol sets corresponding to all SLIVs conflict with the uplink symbols in a slot in the slot set D, there may not be any downlink transmission in the slot, so the slot does not contain any downlink transmission occasions. If the PDSCH is configured with repeated transmission, as long as one SLIV is available in one of a plurality of slots of repeated transmission, the SLIV needs to be reserved, that is, only an SLIV conflicts with the uplink symbols in each of the plurality of slots of repeated transmission, then the SLIV can be removed. In the above manner, a set MC of downlink transmission occasions corresponding to the carrier c may be obtained, Mc is composed of the downlink transmission occasions determined in the above manner in each slot in the slot set D, and an HARQ-ACK codebook of the carrier c in the slot n is determined according to Mc, including a size of the codebook and a specific content and sequence of the HARQ-ACK (specifically, a corresponding relationship between the downlink transmission received on the carrier c and a downlink transmission occasion in Mc may be found according to a location of a slot in which the transmission is performed in the slot set D and an SLIV location in the slot in which the transmission is performed, and the HARQ-ACK for the downlink transmission is mapped to the corresponding location of the downlink transmission occasion in the HARQ-ACK codebook). When carrier aggregation is configured, the HARQ-ACK codebook corresponding to each carrier is concatenated according to a carrier index sequence (for example, from small to large) to obtain the HARQ-ACK codebook to be transmitted finally by UE in the slot n. Specifically, taking one carrier and one slot supporting only one unicast PDSCH transmission as an example, assuming that the K1 set is {2,3,4,5,6,7,8,9}, a set Mc that has the HARQ-ACK feedback correspondingly in a slot (n+9) is determined, as shown in FIG. 5. A slot determined according to K1=5 and K1=6 is a UL slot configured in a semi-static mode, and there is no downlink transmission. Therefore, there is no downlink transmission occasion in these two slots, and it is not necessary to reserve an HARQ-ACK location in the HARQ-ACK codebook, so that redundancy information of the HARQ-ACK codebook is reduced.

For SPS PDSCH release, since it is one piece of DCI and there is no SLIV used by itself, a corresponding HARQ-ACK mapping location in the HARQ-ACK codebook cannot be found in the above manner. Therefore, it can be specified that the SPS PDSCH release can use the SLIV corresponding to the released SPS PDSCH to determine the mapping location of the HARQ-ACK. Specifically, the SLIV may be applied to a slot in which the SPS PDSCH release is transmitted, and the downlink transmission occasion corresponding to the SLIV may be found. Then a location of the HARQ-ACK of the SPS PDSCH release in the HARQ-ACK codebook can be determined according to the slot and the location of the downlink transmission occasion in the slot in the set Mc, thereby mapping the HARQ-ACK of the SPS PDSCH release to the HARQ-ACK codebook, that is, the SLIV of the released SPS PDSCH is used as the SLIV of the SPS PDSCH release. According to the above manner for each PDSCH, the location of the HARQ-ACK of the SPS PDSCH release in the HARQ-ACK codebook can be determined. When one piece of DCI that may release a plurality of SPS PDSCHs on one carrier is introduced, it may be specified to determine the HARQ-ACK location of the SPS PDSCH release by using the SLIV corresponding to the SPS PDSCH corresponding to a minimum SPS configuration index among the plurality of released SPS PDSCHs.

The technical solutions provided by the embodiments of the present application may be applied to a variety of systems, especially a 5G system. For example, the applicable systems may be a global system of mobile communication (GSM), a code division multiple access (CDMA) system, a wideband code division multiple access (WCDMA) general packet radio service (GPRS) system, a long term evolution (LTE) system, an LTE frequency division duplex (FDD) system, an LTE time division duplex (TDD), a universal mobile telecommunication system (UMTS), a worldwide interoperability for microwave access (WiMAX) system, a 5G system, a 5G NR system and the like. These various systems each include a terminal device and a network device.

A terminal device involved in the embodiments of the present application may refer to a device that provides voice and/or data connectivity to a user, a handheld device with a wireless connection function, or other processing devices connected to a wireless modem. In different systems, the name of the terminal devices may be different. For example, in the 5G system, the terminal device may be called user equipment (UE). The wireless terminal device may communicate with one or more core networks via a wireless access network (RAN). The wireless terminal device may be a mobile terminal device, such as a mobile phone (or called "cellular" phone) and a computer with a mobile terminal device, for example, may be a portable, pocket-size, handheld, computer built-in or vehicle-mounted moving apparatus, which exchange language and/or data with a wireless access network. For example, it may be devices such as a personal communication service (PCS) telephone, a cordless telephone, a session initiated protocol (SIP) telephone, a wireless local loop (WLL) station, and a personal digital assistant (PDA). The wireless terminal device may also be called a system, a subscriber unit, a subscriber station, a mobile station, a mobile, a remote station, an access point, a remote terminal, an access terminal, a user terminal, a user agent and a user device, which is not limited in the embodiments of the present application.

The network device involved in the embodiments of the present application may be a base station, and the base station may include a plurality of cells. According to different specific application occasions, the base station may also be called an access point, or may refer to a device in an access network that communicates with a wireless terminal device through one or more sectors on an air interface, or other names. The network device may be configured to mutually convert received air frames and internet protocol (IP) packets, and act as a router between the wireless terminal device and the rest of the access network, where the rest of the access network may include an IP communication network. The network device may further coordinate attribute management of the air interface. For example, the network device involved in the embodiments of the present application may be a GSM or a base transceiver station (BTS) in code division multiple access (CDMA), may also be a NodeB in WCDMA, may further be an evolutional network device (an evolutional node B, eNB or e-NodeB) in an LTE system, a 5G base station in a 5G network architecture (next generation system), and may also be a home evolved node B (HeNB), a relay node, a femto, a pico and the like, which is not limited in the embodiments of the present application.

Various embodiments of the present application will be described in detail below in combination with the accompanying drawings of the specification. It should be noted that the display order of the embodiments of the present application only represents the order of the embodiments, and does not represent advantages and disadvantages of the technical solutions provided by the embodiments.

In the present application, in order to ensure the normal transmission of HARQ-ACK, it is necessary to ensure the uniform understanding for HARQ-ACK transmission of a terminal and a network-side device, therefore, the terminal and the network-side device have the same behavior in determining a feedback information transmission location, and the following describes the determination of the feedback information transmission location by the terminal.

Figure 6:
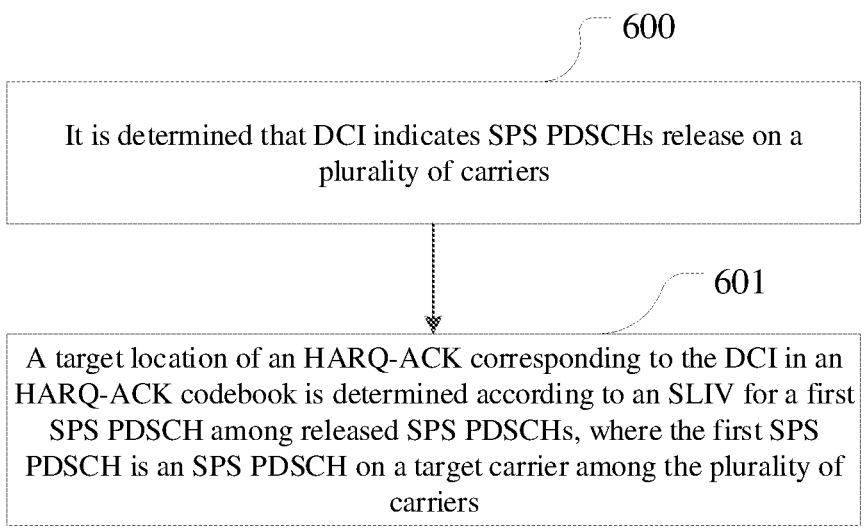
FIG. 6 is a flow chart of a method for determining a feedback information transmission location provided by an embodiment of the present application.

As shown in FIG. 6, which is a method for determining a feedback information transmission location provided by an embodiment of the present application, the method includes the following steps.

Step 600, it is determined that DCI indicates SPS PDSCHs release on a plurality of carriers.

Step 601, a target location of an HARQ-ACK corresponding to the DCI in an HARQ-ACK codebook is determined according to an SLIV for a first SPS PDSCH among released SPS PDSCHs, where the first SPS PDSCH is an SPS PDSCH indicated by the DCI to release SPS on a target carrier among the plurality of carriers.

The target carrier includes:
a carrier for DCI transmission; or
a carrier with a largest carrier index among the plurality of carriers indicated by the DCI to release SPS; or
a carrier with a smallest carrier index among the plurality of carriers indicated by the DCI to release SPS; or
each of the plurality of carriers indicated by the DCI to release SPS.

In the present application, the determining the target location of the HARQ-ACK corresponding to the DCI in the HARQ-ACK codebook according to the SLIV for the first SPS PDSCH among the released SPS PDSCHs, further includes:
determining the target location of the HARQ-ACK corresponding to the DCI in the HARQ-ACK codebook according to a first time unit of the target carrier (that is, the first time unit is a time unit on the target carrier, namely the time unit determined according to SCS of the target carrier), where the first time unit is the first or last time unit or each time unit among time units overlapping with the DCI; or
determining the target location of the HARQ-ACK corresponding to the DCI in the HARQ-ACK codebook according to a second time unit of the target carrier (that is, the second time unit is a time unit on the target carrier, namely the time unit determined according to the SCS of the target carrier), where the second time unit is the first or last time unit or each time unit among time units overlapping with a time unit for DCI transmission (the time unit in which the DCI is transmitted is a time unit on a carrier for the DCI transmission, namely the time unit determined according to the SCS of the carrier in which the DCI is transmitted).

Specifically, when the SCS of the target carrier is the same as the SCS of the carrier for the DCI transmission, or the SCS of the target carrier is smaller than the SCS of the carrier for the DCI transmission, the first time unit is the time unit on the target carrier overlapping with the DCI (that is, when the SCSs are the same, there is only one time unit on the target carrier overlapping with the DCI, and the first or last time unit or each time unit in the time units on the target carrier overlapping with the DCI is the time unit itself overlapping with the DCI), or the second time unit is the time unit on the target carrier overlapping with the time unit in which the DCI is transmitted (that is when the SCSs are the same, there is only one time unit on the target carrier overlapping with the time unit in which the DCI is transmitted, and the first or last time unit or each time unit in the time units on the target carrier overlapping with the time unit in which the DCI is transmitted is the time unit itself overlapping with the time unit in which the DCI is transmitted).

Specifically, when the SCS of the target carrier is different from the SCS of the carrier in which the DCI is transmitted, or the SCS of the target carrier is greater than the SCS of the carrier in which the DCI is transmitted, the first time unit is the first or last time unit or each time unit in a plurality of time units, overlapping with the DCI, on the target carrier; or the second time unit is the first or last time unit or each time unit in a plurality of time units, overlapping the time unit in which the DCI is transmitted, on the target carrier.

Specifically, the determining the target location of the HARQ-ACK corresponding to the DCI in an HARQ-ACK codebook corresponding to the target carrier according to the SLIV of a first SPS resource on the target carrier, includes the following:
the target location of the HARQ-ACK corresponding to the DCI in the HARQ-ACK codebook corresponding to the target carrier is determined according to the first time unit of the target carrier and the SLIV of the first SPS PDSCH, that is, a corresponding candidate downlink transmission occasion of the SLIV in a candidate downlink transmission occasion set corresponding to the first time unit is determined according to the SLIV corresponding to the first SPS PDSCH in the first time unit, so that it is determined that the HARQ-ACK for the DCI is mapped to the HARQ-ACK location corresponding to the candidate downlink transmission occasion in the candidate downlink transmission occasion set included in the first time unit in the HARQ-ACK codebook corresponding to the target carrier (that is, the HARQ-ACK location corresponding to the downlink transmission occasion in the candidate downlink transmission occasion set corresponding to the first time unit is found in the HARQ-ACK codebook, and the HARQ-ACK for the DCI is mapped to the location, that is, the HARQ-ACK locations corresponding to the candidate downlink transmission occasion set corresponding to the first time unit may be found according to a corresponding relationship between the HARQ-ACK locations and the time units in the HARQ-ACK codebook, and among these HARQ-ACK locations, the HARQ-ACK location corresponding to the candidate downlink transmission occasion corresponding to the SLIV is further found); or the target location of the HARQ-ACK corresponding to the DCI in the HARQ-ACK codebook corresponding to the target carrier is determined according to the second time unit of the target carrier and the SLIV of the first SPS PDSCH, that is, a corresponding candidate downlink transmission occasion of the SLIV in a candidate downlink transmission occasion set corresponding to the second time unit is determined according to the SLIV corresponding to the first SPS PDSCH in the second time unit, so that it is determined that the HARQ-ACK for the DCI is mapped to the HARQ-ACK location corresponding to the candidate downlink transmission occasion in the candidate downlink transmission occasion set included in the second time unit in the HARQ-ACK codebook corresponding to the target carrier (that is, the HARQ-ACK location corresponding to the downlink transmission occasion in the candidate downlink transmission occasion set corresponding to the second time unit is found in the HARQ-ACK codebook, and the HARQ-ACK for the DCI is mapped to the location, that is, the HARQ-ACK locations corresponding to the candidate downlink transmission occasion set corresponding to the second time unit may be found according to a corresponding relationship between the HARQ-ACK locations and the time units in the HARQ-ACK codebook, and among these HARQ-ACK locations, the HARQ-ACK location corresponding to the candidate downlink transmission occasion corresponding to the SLIV is further found).

If there are a plurality of first time units (for example, when the SCS of the target carrier is greater than the SCS of the carrier in which the DCI is transmitted, there are a plurality of time units on the target carrier overlapping with the DCI or the time unit in which the DCI is transmitted, and the first time unit is defined as each time unit among these time units on the target carrier overlapping with the DCI or the time unit in which the DCI is transmitted), for each of the plurality of first time units, the above steps are respectively repeated, and an HARQ-ACK location corresponding to a candidate downlink transmission occasion corresponding to an SLIV in the first SPS PDSCH in each of the plurality of first time units respectively in the HARQ-ACK codebook of the target carrier may be obtained, so that the HARQ-ACK for the DCI is repeatedly mapped to each HARQ-ACK location.

If there are a plurality of target carriers (for example, the target carrier is defined as each of the plurality of carriers indicated by the DCI to release SPS), for each of the plurality of target carriers, the above steps are respectively repeated, and a mapping location of the HARQ-ACK for the DCI respectively in the HARQ-ACK codebook of each target carrier may be obtained, so that the HARQ-ACK for the DCI is repeatedly mapped to each HARQ-ACK location.

In the present application, each time unit includes a predefined time period, or a subframe, or a slot, or a sub-slot composed of N symbols, and N is a positive integer.

In the present application, when there are a plurality of released SPS PDSCHs on the target carrier, the first SPS PDSCH is an SPS PDSCH with a smallest SPS configuration index among the plurality of SPS PDSCHs released by indicating of the DCI on the target carrier.

In the present application, the HARQ-ACK codebook is a semi-static HARQ-ACK codebook. That is, when the semi-static HARQ-ACK codebook is configured to use, the above manner is adopted to determine a location of the HARQ-ACK for the DCI mapped in the HARQ-ACK codebook.

In the present application, when the target carrier is a carrier in which the DCI is transmitted, or a carrier with a largest carrier index among the plurality of carriers, or a carrier with a smallest carrier index among the plurality of carriers, the method specifically includes the following:

when there are a plurality of SPS PDSCHs released by indicating of the DCI on the target carrier, the first SPS PDSCH is a corresponding SPS PDSCH with a smallest SPS configuration index among the plurality of SPS PDSCHs released by indicating of the DCI transmitted on the target carrier; and when the location of the HARQ-ACK for the DCI in the HARQ-ACK codebook is determined according to the SLIV of the first SPS PDSCH in the released SPS PDSCHs, the method further includes: determining the location of the HARQ-ACK for the DCI in the HARQ-ACK codebook according to the first or last time unit or each time unit among the time units on the target carrier overlapping with the DCI; or determining the location of the HARQ-ACK for the DCI in the HARQ-ACK codebook according to the first or last time unit or each time unit among the time units on the target carrier overlapping with the time unit in which the DCI is transmitted.

Where, the location of the HARQ-ACK for the DCI in the HARQ-ACK codebook may be directly determined according to the above manner, and the location of the HARQ-ACK for the DCI in the HARQ-ACK codebook may also be determined according to the above manner when the SCS of the target carrier is different from the SCS of the DCI or when the target carrier is different from the in which where the DCI is transmitted; and the HARQ-ACK for the DCI is mapped in the HARQ-ACK codebook corresponding to the target carrier.

In the present application, when the target carrier is each of the plurality of carriers, the method specifically includes the following:

for each carrier, when there are a plurality of SPS PDSCHs released by indicating of the DCI, the first SPS PDSCH is a corresponding SPS PDSCH with a smallest SPS configuration index among the plurality of SPS PDSCHs released by indicating of the DCI transmitted on the current carrier; and for each carrier, when the location of the HARQ-ACK for the DCI in the HARQ-ACK codebook is determined according to the SLIV of the first SPS PDSCH among the released SPS PDSCHs, the method further includes: determining the location of the HARQ-ACK for the DCI in the HARQ-ACK codebook according to the first or last time unit or each time unit among the time units on the carrier overlapping with the DCI; or determining the location of the HARQ-ACK for the DCI in the HARQ-ACK codebook according to the first or last time unit or each time unit among the time units on the carrier overlapping with the time unit in which the DCI is transmitted.

Where, the location of the HARQ-ACK for the DCI in the HARQ-ACK codebook may be directly determined according to the above manner, and the location of the HARQ-ACK for the DCI in the HARQ-ACK codebook may also be determined according to the above manner when the SCS of the carrier is different from the SCS of the DCI or when the carrier is different from the carrier in which the DCI is transmitted; and the HARQ-ACK for the DCI is mapped in the HARQ-ACK codebook corresponding to the each carrier.

Specifically, the following embodiments are used to describe the determination of the feedback information transmission location by the terminal.

Embodiment 1

Figure 7:
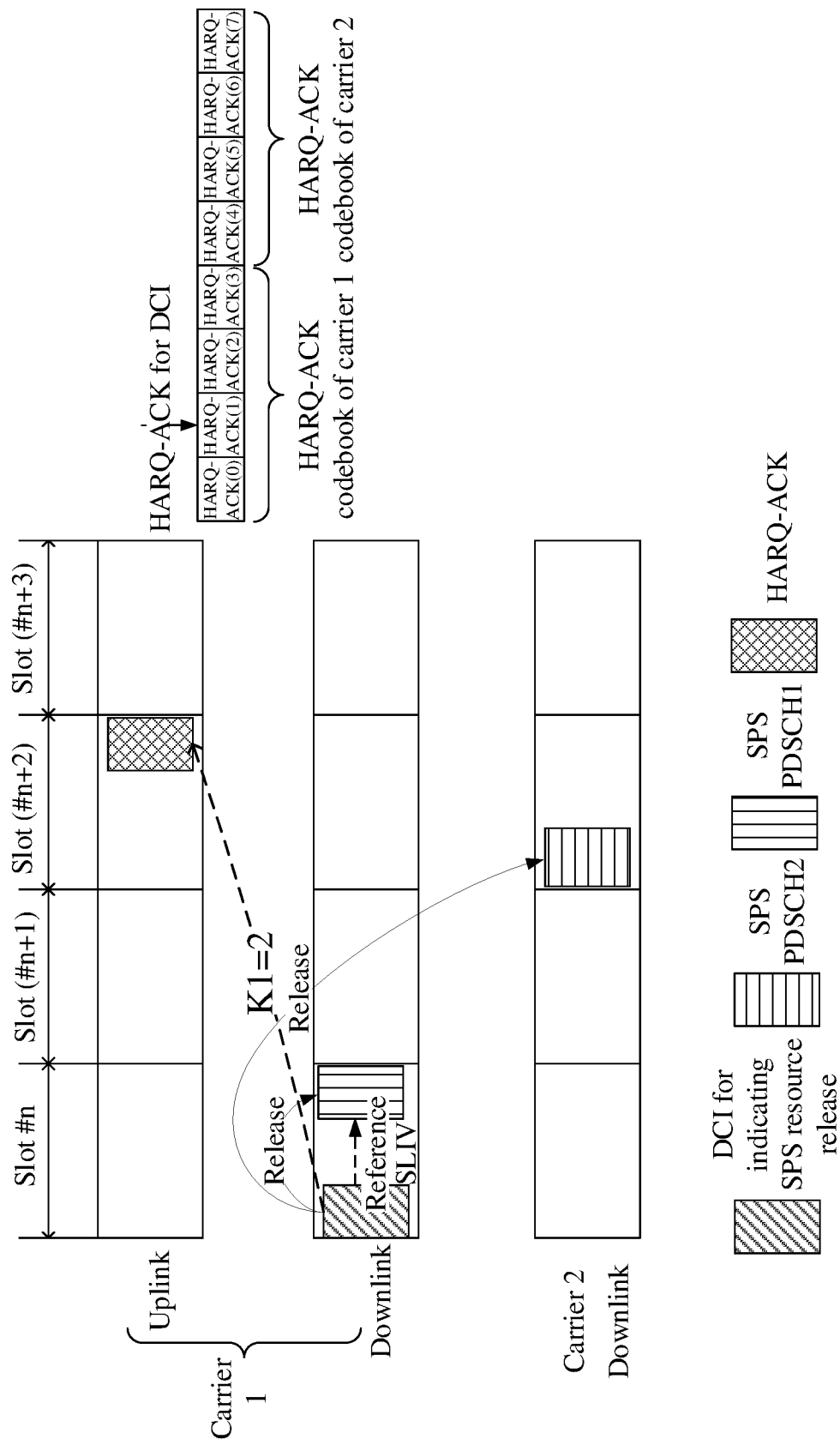
FIG. 7 is a schematic diagram of determining a location of an HARQ-ACK for DCI in an HARQ-ACK codebook according to an SLIV for released SPS on a carrier in which the DCI is transmitted provided by an embodiment of the present application.
Figure 8:
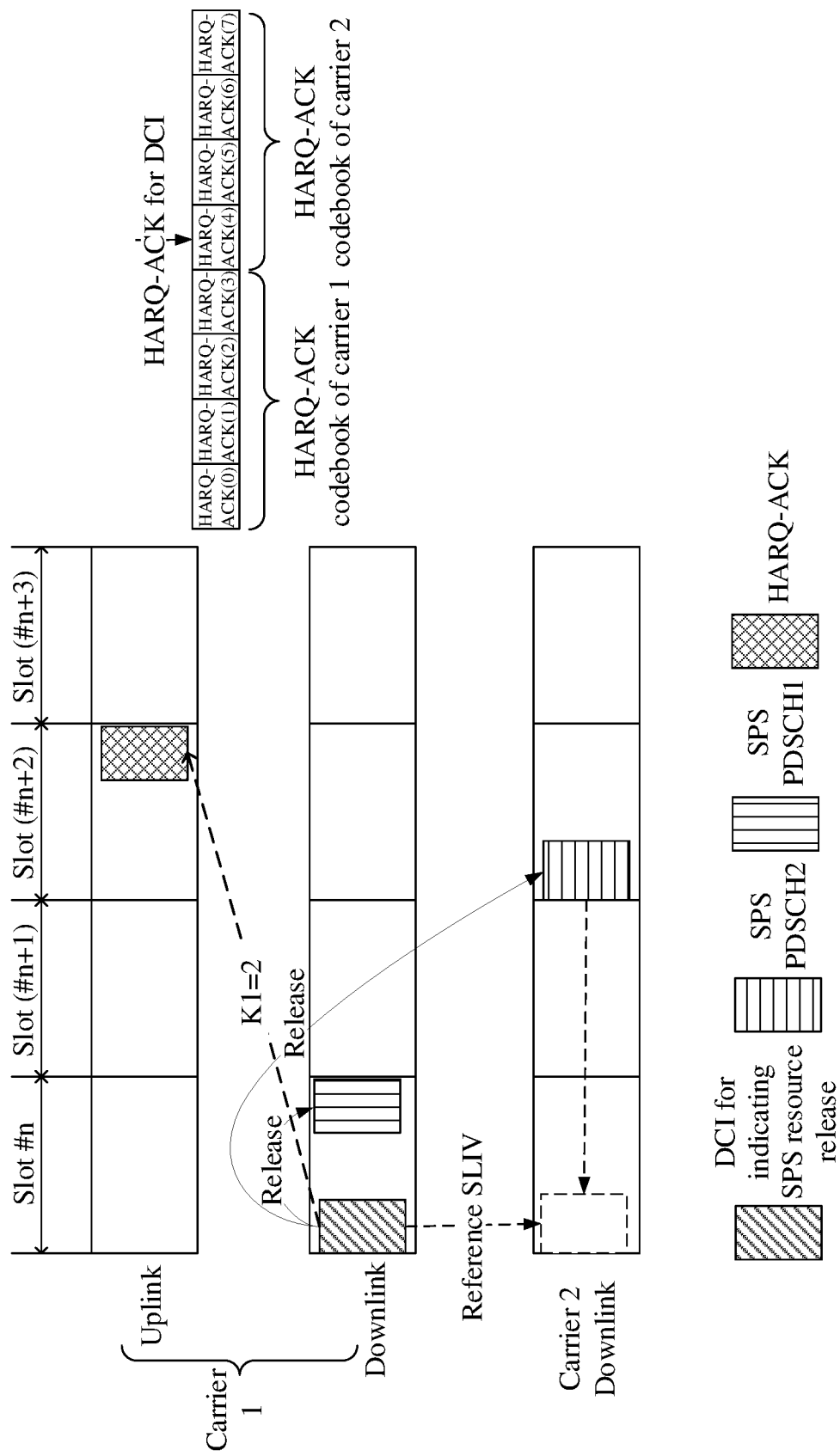
FIG. 8 is a schematic diagram of determining a location of an HARQ-ACK for DCI in an HARQ-ACK codebook according to an SLIV for released SPS on a carrier with a largest number among carriers released by indicating of the DCI provided by an embodiment of the present application.
Figure 9:
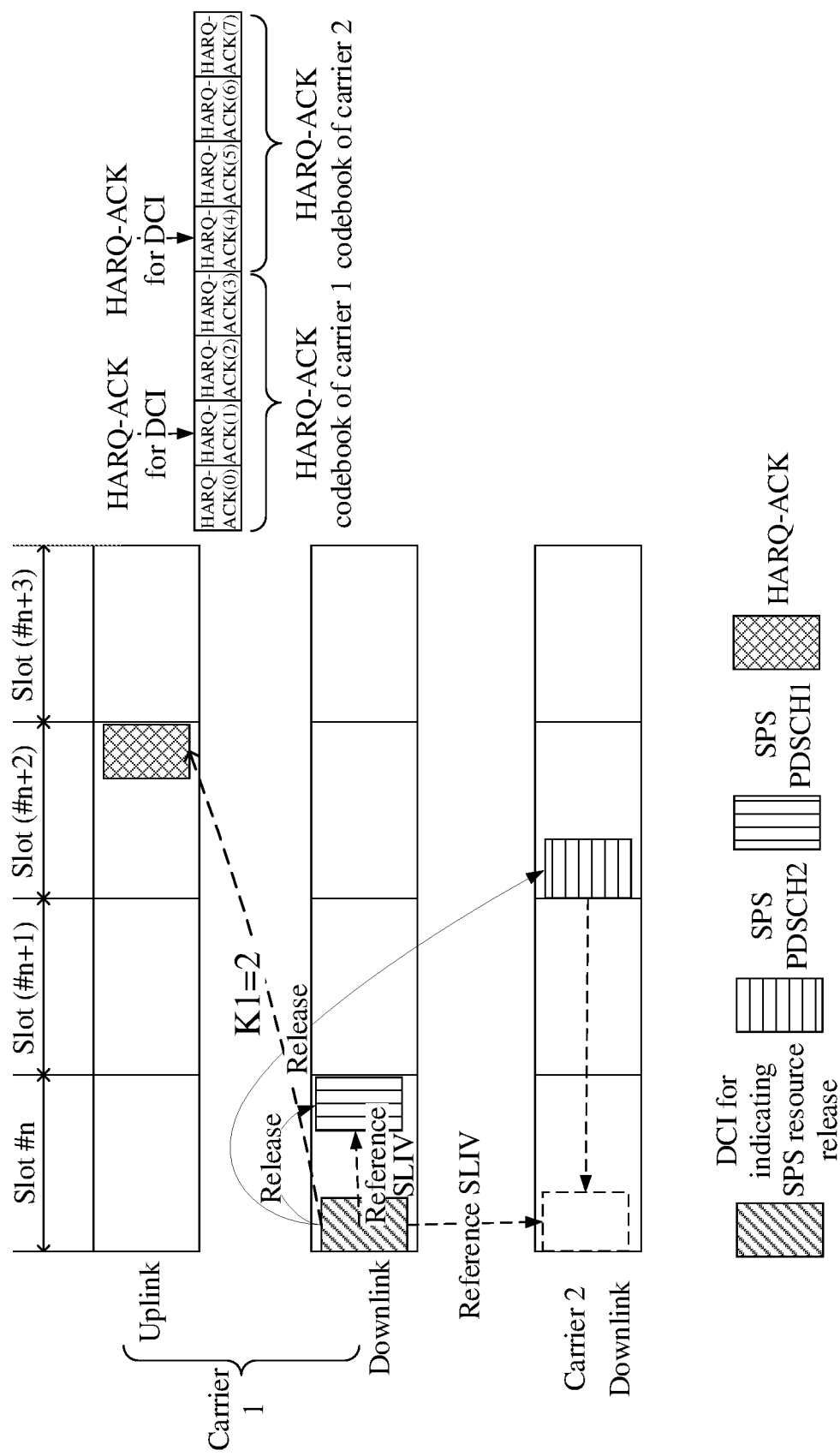
FIG. 9 is a schematic diagram of determining a location of an HARQ-ACK for DCI in an HARQ-ACK codebook according to an SLIV for released SPS on each of carriers released by indicating of the DCI provided by an embodiment of the present application.

It is assumed that the network-side device sends one piece of DCI in a slot n of a carrier 1 to indicate SPS PDSCH1 release on the carrier 1 and an SPS PDSCH2 on a carrier 2, that the feedback timing K1 from PDSCH to HARQ-ACK indicated in the DCI is equal to 2, and that a semi-static HARQ-ACK codebook is used and a K1 set is configured as {1, 2}, there are two SLIV groups in each slot, that is, there are two possible downlink transmission occasions in each slot, that is, in a slot (n+2), the HARQ-ACK codebook corresponding to each downlink carrier contains 4 bits of information (assuming that each downlink transmission occasion corresponds to 1 bit of HARQ-ACK, of course, in other embodiments, each downlink transmission occasion may correspond to multiple bits of HARQ-ACK, which may be specifically determined according to a transmission mode and other parameters, but does not affect the method for determining the HARQ-ACK location for DCI in the present application), corresponding to each two downlink transmission occasions in a slot n and a slot (n+1) respectively, the final codebook in the slot (n+2) is 8 bits, which is obtained by concatenating 4 bits of HARQ-ACK of the carrier 1 and 4 bits of HARQ-ACK of the carrier 2, as shown in FIG. 7 to FIG. 9.

In the embodiments, the situations that the target carrier respectively is a carrier in which the DCI is transmitted and SPS is indicated to be released, a carrier with a largest carrier index among the plurality of carriers indicated by the DCI to release SPS, a carrier with a smallest carrier index among the plurality of carriers indicated by DCI to release SPS, and each of the plurality of carriers indicated by the DCI to release SPS are described in the following modes.

Mode 1: the target carrier is a carrier in which the DCI is transmitted and SPS is indicated to be released.

A location of HARQ-ACK for the DCI in an HARQ-ACK codebook is determined according to an SLIV of SPS released on the carrier in which the DCI is transmitted; then the location of the HARQ-ACK for the DCI in the HARQ-ACK codebook is determined according to an SLIV of an SPS PDSCH1 on a carrier 1, that is, the SLIV of the SPS PDSCH1 is borrowed to find a corresponding SLIV location in the slot n in which the DCI is transmitted; and according to which SLIV group the SLIV location belongs to, it may determine that it corresponds to which downlink transmission occasion in the slot n on the carrier 1. For example, if it is determined that it corresponds to the second SLIV group, then it is determined that it corresponds to a second downlink transmission occasion, and it is determined that the HARQ-ACK for the DCI is mapped to a location of the second downlink transmission occasion in the two downlink transmission occasions in the corresponding slot n in the HARQ-ACK codebook of the carrier 1, namely a location of a second bit in a 4-bit HARQ-ACK codebook of the carrier 1, and then a final 8-bit HARQ-ACK codebook is obtained and transmitted to the network-side device on a corresponding PUCCH resource. As shown in FIG. 7, 8 bits of HARQ-ACK are received by the network-side device on the corresponding PUCCH resource, and the location of the HARQ-ACK for the DCI in the HARQ-ACK codebook is determined according to the same mode as above, so that the HARQ-ACK corresponding to the DCI is obtained.

Mode 2: the target carrier is a carrier with a smallest carrier index among the plurality of carriers indicated by the DCI to release SPS.

A location of an HARQ-ACK for the DCI in an HARQ-ACK codebook is determined according to an SLIV of SPS released on the carrier with the smallest number among the carriers indicated by the DCI to release, then the carrier with the smallest number is a carrier 1, the location of the HARQ-ACK for the DCI in the HARQ-ACK codebook is determined according to an SLIV of an SPS PDSCH1 on the carrier 1, that is, the SLIV of the SPS PDSCH1 is borrowed to find a slot overlapping with the slot n in which the DCI is transmitted on the carrier 1. Because the carrier 1 is the carrier in which the DCI is transmitted, the overlapping slot is the slot n on the carrier 1, an SLIV location of the corresponding SPS PDSCH1 is found in the slot n of the carrier 1, and according to which SLIV group the SLIV location belongs to, it may determine that it corresponds to which downlink transmission occasion in the slot n on the carrier 1. For example, if it is determined that it corresponds to the second SLIV group, then it is determined that it corresponds to a second downlink transmission occasion in the slot n on the carrier 1, and it is determined that the HARQ-ACK for the DCI is mapped to a location of the second downlink transmission occasion in the two downlink transmission occasions in the corresponding slot n in the HARQ-ACK codebook of the carrier 1, namely a location of a second bit (namely the second bit in an HARQ-ACK codebook after the HARQ-ACK codebooks of the carrier 1 and the carrier 2 are concatenated) in a 4-bit HARQ-ACK codebook of the carrier 2, and then a final 8-bit HARQ-ACK codebook is obtained and transmitted to the network-side device on a corresponding PUCCH resource. As shown in FIG. 7, 8 bits of HARQ-ACK are received by the network-side device on the corresponding PUCCH resource, and the location of the HARQ-ACK for the DCI in the HARQ-ACK codebook is determined according to the same mode as above, so that the HARQ-ACK corresponding to the DCI is obtained.

Mode 3, the target carrier is a carrier with the largest carrier index among the plurality of carriers indicated by the DCI to release SPS.

A location of HARQ-ACK for the DCI in an HARQ-ACK codebook is determined according to an SLIV of SPS released on the carrier with the largest number among the carriers indicated by the DCI to release, then the carrier with the largest number is a carrier 2, the location of the HARQ- ACK for the DCI in the HARQ-ACK codebook is determined according to an SLIV of an SPS PDSCH2 on the carrier 2, that is, the SLIV of the SPS PDSCH2 is borrowed to find a slot overlapping with the slot n in which the DCI is transmitted on the carrier 2. Because sub-carrier intervals of the carriers 1 and 2 are the same, the overlapping slot is also the slot n on the carrier 2, an SLIV location of the corresponding SPS PDSCH2 is found in the slot n of the carrier 2, and according to which SLIV group the SLIV location belongs to, it may determine that it corresponds to which downlink transmission occasion in the slot n on the carrier 2. For example, if it is determined that it corresponds to the first SLIV group, then it is determined that it corresponds to a first downlink transmission occasion in the slot n on the carrier 2, and it is determined that the HARQ-ACK for the DCI is mapped to a location of the first downlink transmission occasion in the two downlink transmission occasions in the corresponding slot n in the HARQ-ACK codebook of the carrier 2, namely a location of a first bit (namely a fifth bit in an HARQ-ACK codebook after the HARQ-ACK codebooks of the carrier 1 and the carrier 2 are concatenated) in a 4-bit HARQ-ACK codebook of the carrier 2, and then a final 8-bit HARQ-ACK codebook is obtained and transmitted to the network-side device on a corresponding PUCCH resource. As shown in FIG. 8, 8 bits of HARQ-ACK are received by the network-side device on the corresponding PUCCH resource, and the location of the HARQ-ACK for the DCI in the HARQ-ACK codebook is determined according to the same mode as above, so that the HARQ-ACK corresponding to the DCI is obtained.

Mode 4: the target carrier is each of the plurality of carriers indicated by the DCI to release SPS.

A mapping location of an HARQ-ACK for the DCI in an HARQ-ACK codebook of each carrier is determined according to an SLIV of the released SPS PDSCH on each carrier, that is, the HARQ-ACK for the DCI is transmitted in the HARQ-ACK codebook of each released carrier. Specifically, the processing mode for the carrier 1 in the above mode 1 or 2 is performed on the carrier 1, so that the HARQ-ACK for the DCI is mapped to a location of a second bit (namely a second bit in an HARQ-ACK codebook after the HARQ-ACK codebooks of the carrier 1 and the carrier 2 are concatenated) in 4 bits of HARQ-ACK of the carrier 1. The processing mode for the carrier 2 in the above mode 3 is performed on the carrier 2, so that the HARQ-ACK for the DCI is mapped to a location of a first bit (namely a fifth bit in an HARQ-ACK codebook after the HARQ-ACK codebooks of the carrier 1 and the carrier 2 are concatenated) in 4 bits of HARQ-ACK of the carrier 2, and then a final 8-bit HARQ-ACK codebook is obtained and transmitted to the network-side device on the corresponding PUCCH resource. As shown in FIG. 9, 8 bits of HARQ-ACK are received by the network-side device on the corresponding PUCCH resource, and the location of the HARQ-ACK for the DCI in the HARQ-ACK codebook is determined according to the same mode as above, so that the HARQ-ACK corresponding to the DCI is obtained. The network-side device may choose to determine whether the DCI is successfully received according to one piece of feedback information, for example, if one piece of information is ACK, it may be considered as successful reception (only if all pieces of information are NACK, it may be considered as failure), or if one piece of information is NACK, it may be considered as failure (only if all pieces of information are ACK, it may be considered as success); or it may first combine the two pieces of HARQ-ACK information to obtain the HARQ-ACK information after the combination process to determine whether the DCI is successfully received.

It should be noted that the above embodiments only take one SPS released on one carrier as an example. If a plurality of SPS configurations are released on one carrier, a location of HARQ-ACK for the DCI indicating to release the SPS in the HARQ-ACK codebook may be determined according to an SLIV corresponding to the SPS with a smallest SPS configuration index among the plurality of SPS configurations released on the carrier. For example, if the DCI indicating to release the SPS in the above embodiments indicates to release two SPS configurations on the carrier 1, such as an SPS configuration 1 and an SPS configuration 3, when being processed according to the above mode 1 or 2, an SLIV of the SPS configuration 1 released on the carrier 1 is selected to determine the location of the HARQ-ACK for the DCI indicating to release the SPS in the HARQ-ACK codebook. For another example, if the DCI indicating to release the SPS in the above embodiments indicates to release two SPS configurations on the carrier 2, such as an SPS configuration 2 and an SPS configuration 4, when being processed according to the above mode 3, an SLIV of the SPS configuration 2 released on the carrier 2 is selected to determine the location of the HARQ-ACK for the DCI indicating to release the SPS in the HARQ-ACK codebook. For yet another example, when the mode 4 is used, if a plurality of SPS configurations are also released on each carrier, similarly, the location of the HARQ-ACK for the DCI indicating to release the SPS in the HARQ-ACK codebook may be determined according to the SLIV corresponding to the SPS with the smallest SPS configuration index among the plurality of SPS configurations released on the carrier.

It should be noted that the above embodiments only takes two carriers indicated by the DCI to release the SPS as an example, the SPS on more carriers may further be released, the carriers of the released SPS may contain or not contain the carrier in which the DCI indicating to release the SPS is transmitted, and the above modes are also applicable. The above takes frequency division duplex (FDD) as an example, and if it is time division duplex (TDD), downlink slots and uplink slots alternate with a TDM manner on the same carrier, the above modes are also applicable.

In the present application, when the SCS between the carriers indicated by the DCI to release the SPS are different, the above modes are also applicable, and please refer to the following embodiment for details.

Embodiment 2

If in the above embodiment 1, it is assumed that the SCS on the carrier 1 is 15 kHz, the SCS on the carrier 2 is 30 kHz, and that the location of the HARQ-ACK for the DCI indicating to release the SPS in the HARQ-ACK codebook of the carrier 2 is determined by adopting the above mode 3, then when the location of the HARQ-ACK for the DCI indicating to release the SPS in the HARQ-ACK codebook of the carrier 2 is determined by adopting the above mode 3, a target location of the HARQ-ACK corresponding to the DCI in the HARQ-ACK codebook may be determined by referring to the first or last slot in slots on the carrier 2 overlapping with a slot n in which the DCI is transmitted in the carrier 1. Of course, a corresponding location of the HARQ-ACK for the DCI in the HARQ-ACK codebook may be determined in each slot (namely the first and the last) among the slots on the carrier 2 overlapping with the slot n in which the DCI is transmitted in the carrier 1 (that is, redundant transmission is performed).

Mode 1: the location of the HARQ-ACK for the DCI in the HARQ-ACK codebook is determined according to the first time unit among the time units on the target carrier overlapping with the time unit in which the DCI indicating to release the SPS is transmitted.

Figure 10:
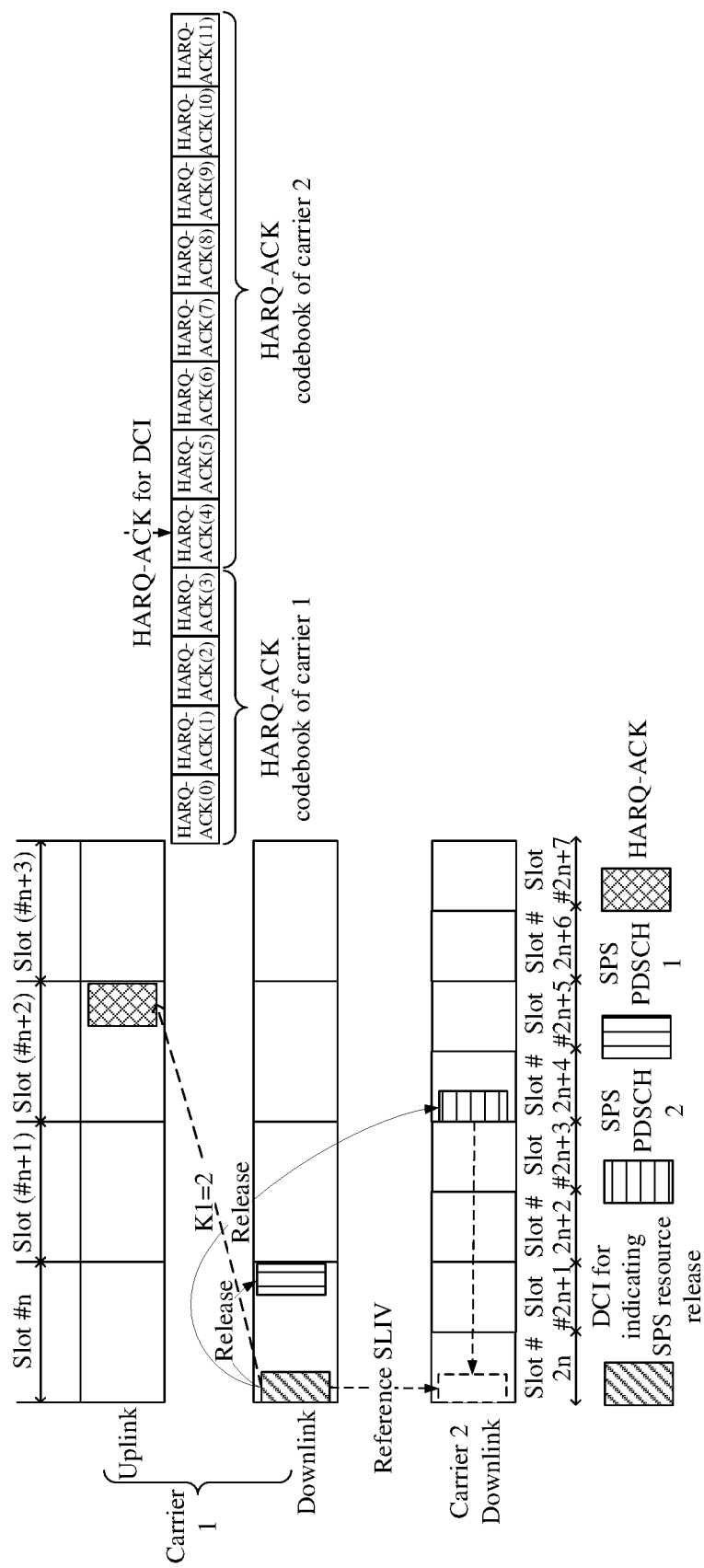
FIG. 10 is a schematic diagram of determining a location of an HARQ-ACK for DCI in an HARQ-ACK codebook according to a first time unit among time units overlapping with a time unit in which the DCI is transmitted on a target carrier when SCSs between a plurality of carriers of SPS resource released by indicating of the DCI are different provided by an embodiment of the present application.

As shown in FIG. 10, the carrier with the largest number is the carrier 2, and the location of the HARQ-ACK for the DCI in the HARQ-ACK codebook is determined according to the first time unit (namely a slot 2n) among the time units on the carrier 2 overlapping with the time unit in which the DCI is transmitted and an SLIV of an SPS PDSCH2 on the carrier 2. That is, the SLIV of the SPS PDSCH2 is borrowed to find an SLIV location corresponding to the SPS PDSCH2 in the first time unit among the time units on the carrier 2 overlapping with the time unit in which the DCI is transmitted; and according to which SLIV group the SLIV location belongs to, a corresponding candidate downlink transmission occasion of the SLIV in the first time unit is determined, so that it is determined that the HARQ-ACK for the DCI is mapped to the HARQ-ACK location, among HARQ-ACK locations corresponding to a candidate downlink transmission occasion set included in the first time unit in the HARQ-ACK codebook, corresponding to the candidate downlink transmission occasion corresponding to this SLIV.

Mode 2: the location of the HARQ-ACK for the DCI in the HARQ-ACK codebook is determined according to the last time unit among the time units on the target carrier overlapping with the time unit in which the DCI indicating to release the SPS is transmitted.

Figure 11:
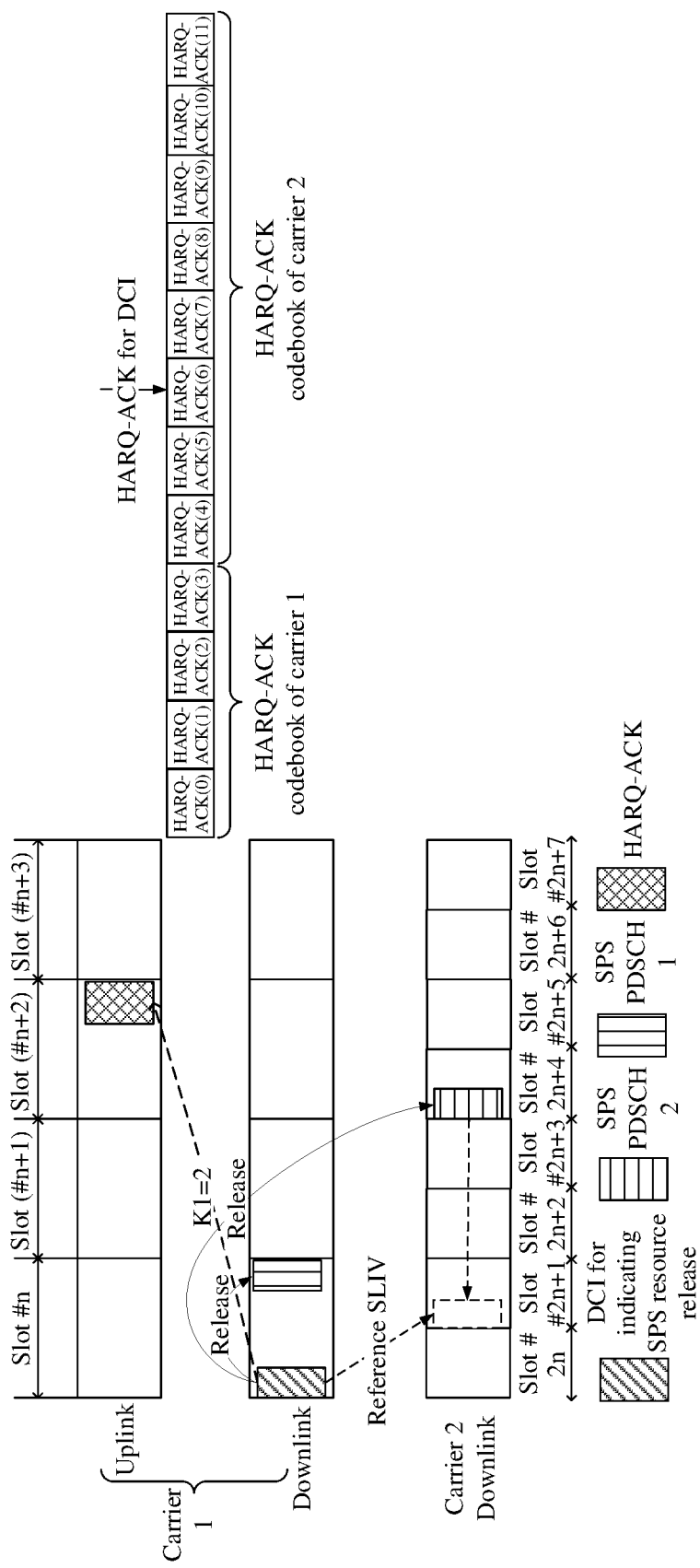
FIG. 11 is a schematic diagram of determining a location of an HARQ-ACK for DCI in an HARQ-ACK codebook according to a last time unit among time units overlapping with a time unit in which the DCI is transmitted on a target carrier when SCSs between a plurality of carriers of SPS resource released by indicating of the DCI are different provided by an embodiment of the present application.

As shown in FIG. 11, the carrier with the largest number is the carrier 2, and the location of the HARQ-ACK for the DCI in the HARQ-ACK codebook is determined according to the last time unit (namely a slot (2n+1)) among the time units on the carrier 2 overlapping with the time unit in which the DCI is transmitted and the SLIV of the SPS PDSCH2 on the carrier 2. That is, the SLIV of the SPS PDSCH2 is borrowed to find the SLIV location corresponding to the SPS PDSCH2 in the last time unit among the time units on the carrier 2 overlapping with the time unit in which the DCI is transmitted, and according to which SLIV group the SLIV location belongs to, a corresponding candidate downlink transmission occasion of the SLIV in the last time unit is determined, so that it is determined that the HARQ-ACK for the DCI is mapped to the HARQ-ACK location, among HARQ-ACK locations corresponding to a candidate downlink transmission occasion set included in the last time unit in the HARQ-ACK codebook, corresponding to the candidate downlink transmission occasion corresponding to this SLIV.

Mode 3: the location of the HARQ-ACK for the DCI in the HARQ-ACK codebook is determined according to the first time unit and the last time unit among the time units on the target carrier overlapping with the time unit in which the DCI indicating to release the SPS is transmitted.

Figure 12:
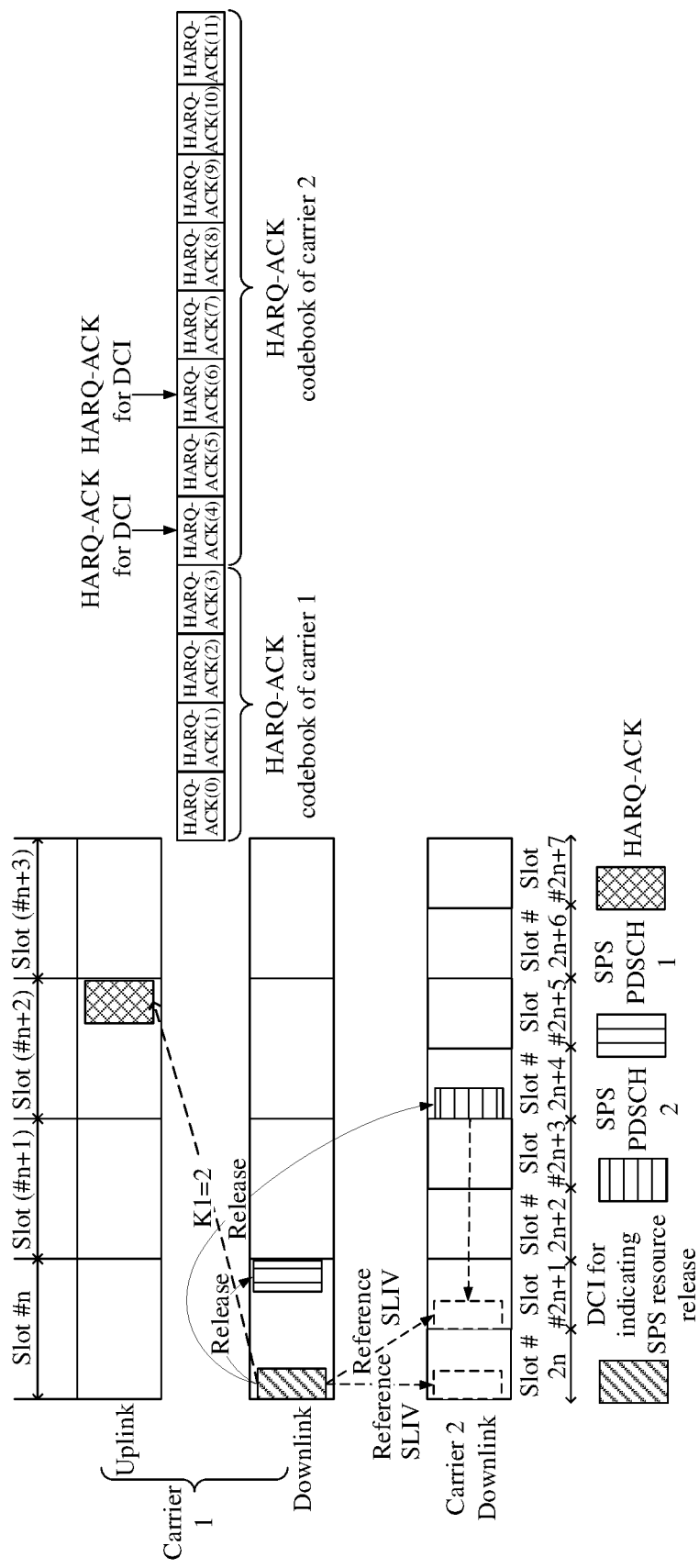
FIG. 12 is a schematic diagram of determining a location of an HARQ-ACK for DCI in an HARQ-ACK codebook according to each of time units overlapping with a time unit in which the DCI is transmitted on a target carrier when SCSs between a plurality of carriers of SPS resource released by indicating of the DCI are different provided by an embodiment of the present application.

As shown in FIG. 12, the carrier with the largest number is the carrier 2, the location of the HARQ-ACK for the DCI in the HARQ-ACK codebook is determined according to the first time unit (namely the slot 2n) and the last time unit (namely the slot (2n+1)) among the time units on the carrier 2 overlapping with the time unit in which the DCI is transmitted and the SLIV of the SPS PDSCH2 on the carrier 2. That is, the SLIV of the SPS PDSCH2 is borrowed to find SLIV locations corresponding to the SPS PDSCH2 respectively in the first time unit and the last time unit among the time units on the carrier 2 overlapping with the time unit in which the DCI is transmitted, and according to which SLIV group the SLIV location belongs to, corresponding candidate downlink transmission occasions of the SLIV in the first time unit and the last time unit are determined, so that it is determined that the HARQ-ACK for the DCI is mapped to the HARQ-ACK location, among HARQ-ACK locations corresponding to a candidate downlink transmission occasion set included in the first time unit and the last time unit in the HARQ-ACK codebook, corresponding to the candidate downlink transmission occasions corresponding to the SLIV.

It should be noted that in the above embodiment 2, in one slot in the determined carrier 2, when the corresponding location of the HARQ-ACK for the DCI indicating to release the SPS in the HARQ-ACK codebook is determined, the specific steps are similar to those in the above embodiment 1, which will not be repeated. The difference is that every two slots on the carrier 2 correspond to one slot of PUCCH transmission, and therefore, in the slot (n+2) in which the PUCCH is transmitted on the carrier 1, the HARQ-ACK location is reserved for each slot on the carrier 2 overlapping with the slots n and n+1, where the slots n and n+1 are slots require HARQ-ACK feedback in the slot (n+2) according to the K1 set on the carrier 1. Also, assuming that there are two downlink transmission occasions in each slot on the carrier 2, the HARQ-ACK codebook of the carrier 2 has 8 bits, including the HARQ-ACK locations of the two downlink transmission occasions in each slot among 4 slots from the slot 2n to the slot (2n+3).

It should be noted that in the above embodiments, only the slot-based HARQ-ACK feedback is taken as an example (that is, the unit of K1 is a slot), and for the sub-slot-based HARQ-ACK feedback (that is, the unit of K1 is a sub-slot), the above method is also applicable.

To sum up, when one piece of DCI indicates performing release with respect to the SPS resources on the plurality of carriers, the location of the HARQ-ACK for the DCI in the HARQ-ACK codebook is determined according to an SLIV of an SPS PDSCH on a specific carrier, or the location of the HARQ-ACK for the DCI in the HARQ-ACK codebook is determined according to an SLIV of an SPS PDSCH on each released carrier. That is, the embodiments of the present application provide a method of how to determine the location of the HARQ-ACK for the DCI in the HARQ-ACK codebook when one piece of DCI simultaneously indicates to release SPS PDSCHs on the plurality of carriers. Normal feedback of the HARQ-ACK for the DCI is ensured when one piece of DCI indicates to release the SPS PDSCHs on the plurality of carriers, uniform understanding for HARQ-ACK transmission by a network-side device and a terminal is ensured, and normal transmission of the HARQ-ACK is ensured.

Based on the same inventive concept, an embodiment of the present application further provides a device for determining a feedback information transmission location. Since the method corresponding to the device is the method for determining the feedback information transmission location in the embodiments of the present application, and a principle for solving problems of the device is similar to the method, implementation of the device may be referred to the implementation of the method, repetitions are omitted.

Figure 13:
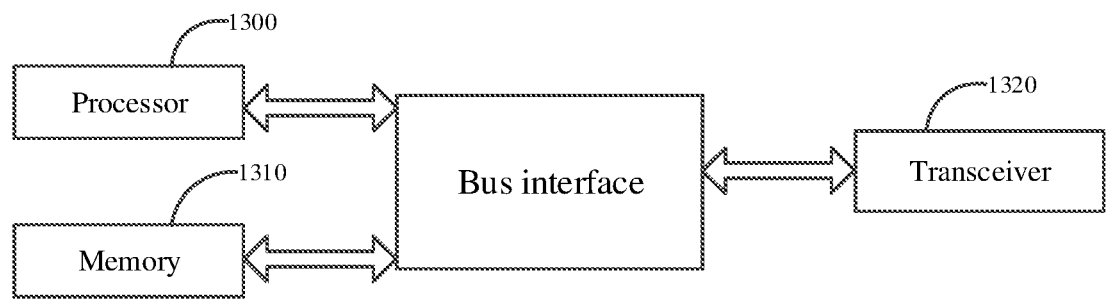
FIG. 13 is a structural diagram of a device for determining a feedback information transmission location provided by an embodiment of the present application.

As shown in FIG. 13, which is a structural diagram of a transmission device of a first uplink channel provided by an embodiment of the present application. The device includes: a processor 1300, a memory 1310 and a transceiver 1320.

The processor 1300 is responsible for managing the bus architecture and general processing, and the memory 1310 may store data used when the processor 1300 executes operations. The transceiver 1320 is configured to receive and send data under the control of the processor 1300.

The bus architecture may include interconnected buses of any quantity and bridges of any quantity, which are specifically linked together through various circuits of one or more processors 1300 represented by the processor and various circuits of memories 1310 represented by the memory 1310. The bus architecture may also link various other circuits such as peripheral devices, voltage regulators, and power management circuits, which are well known in the art, and therefore are not further described herein. A bus interface provides an interface. The processor 1300 is responsible for managing the bus architecture and general processing, and the memory 1310 may store data used when the processor 1300 executes operations.

A process disclosed in the embodiments of the present application may be applied to the processor 1300 or implemented by the processor 1300. During an implementation process, all steps of a signal processing flow may be completed by an integrated logic circuit of hardware or an instruction in the form of software in the processor 1300. The processor 1300 may be a general-purpose processor, a digital signal processor, an application specific integrated circuit, a field programmable gate array or other programmable logic devices, a discrete gate or a transistor logic device, or a discrete hardware component, and may implement or execute methods, steps and logic block diagrams disclosed in the embodiments of the present application. The general-purpose processor may be a microprocessor, or any conventional processor, etc. The steps of the method disclosed by the embodiment of the present application may be directly embodied to be executed and completed by a hardware processor, or may be executed and completed through a combination of hardware and software modules in the processor 1300. The software module may be located in a mature storage medium in the art, such as a random access memory, a flash memory, a read-only memory, a programmable read-only memory, an electrically erasable programmable memory, and a register. The storage medium is located in the memory 1310, and the processor 1300 reads information in the memory 1310, and completes the steps of the signal processing flow in combination with its hardware.

The processor 1300 is configured to read a program in the memory 1310 and execute:
determining that DCI indicates SPS PDSCHs release on a plurality of carriers; and
determining a target location of an HARQ-ACK corresponding to the DCI in an HARQ-ACK codebook according to an SLIV for a first SPS PDSCH among released SPS PDSCHs, where the first SPS PDSCH is an SPS PDSCH on a target carrier among the plurality of carriers.

In a possible implementation, the target carrier includes:
a carrier in which the DCI is transmitted; or
a carrier with a largest carrier index among the plurality of carriers; or
a carrier with a smallest carrier index among the plurality of carriers; or
each of the plurality of carriers.

In a possible implementation, the processor 1300 is further configured to:
determine the target location of the HARQ-ACK corresponding to the DCI in the HARQ-ACK codebook according to a first time unit of the target carrier, where the first time unit is a first or last time unit or each time unit among time units overlapping with the DCI; or
determine the target location of the HARQ-ACK corresponding to the DCI in the HARQ-ACK codebook according to a second time unit of the target carrier, where the second time unit is the first or last time unit or each time unit among time units overlapping with a time unit in which the DCI is transmitted.

In a possible implementation, each of the time units includes a predefined time period, or a subframe, or a slot, or a sub-slot composed of N symbols; and N is a positive integer.

In a possible implementation, when there are a plurality of released SPS PDSCHs on the target carrier, the first SPS PDSCH is an SPS PDSCH with a smallest SPS configuration index among the plurality of released SPS PDSCHs on the target carrier.

In a possible implementation, the HARQ-ACK codebook is a semi-static HARQ-ACK codebook.

Figure 14:
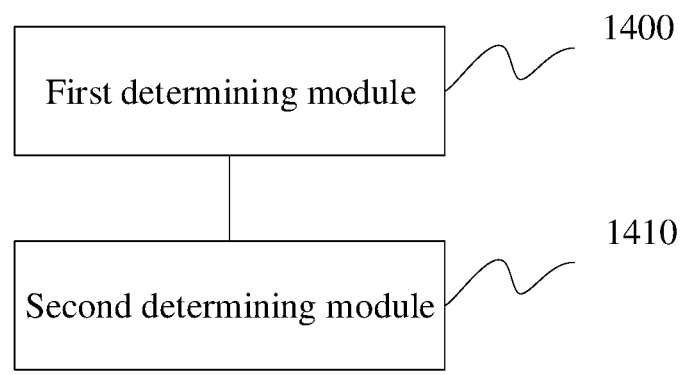
FIG. 14 is a structural diagram of another device for determining a feedback information transmission location provided by an embodiment of the present application.

As shown in FIG. 14, a device for determining a feedback information transmission location in the embodiment of the present application is provided. The device includes: a first determining module 1400 and a second determining module 1410. The first determining module 1400 is configured to determine that DCI indicates SPS PDSCHs release on a plurality of carriers; and the second determining module 1410 is configured to determine a target location of an HARQ-ACK corresponding to the DCI in an HARQ-ACK codebook according to an SLIV for a first SPS PDSCH among released SPS PDSCHs, where the first SPS PDSCH is an SPS PDSCH on a target carrier among the plurality of carriers.

In a possible implementation, the target carrier includes:
a carrier in which the DCI is transmitted; or
a carrier with a largest carrier index among the plurality of carriers; or
a carrier with a smallest carrier index among the plurality of carriers; or
each of the plurality of carriers.

In a possible implementation, the second determining module 1410 is further configured to:
determine the target location of the HARQ-ACK corresponding to the DCI in the HARQ-ACK codebook according to a first time unit of the target carrier, where the first time unit is a first or last time unit or each time unit among time units overlapping with the DCI; or
determine the target location of the HARQ-ACK corresponding to the DCI in the HARQ-ACK codebook according to a second time unit of the target carrier, wherein the second time unit is a first or last time unit or each time unit among time units overlapping with a time unit in which the DCI is transmitted.

In a possible implementation, each of the time units includes a predefined time period, or a subframe, or a slot, or a sub-slot composed of N symbols; and N is a positive integer.

In a possible implementation, when there are a plurality of released SPS PDSCHs on the target carrier, the first SPS PDSCH is an SPS PDSCH with a smallest SPS configuration index among the plurality of released SPS PDSCHs on the target carrier.

In a possible implementation, the HARQ-ACK codebook is a semi-static HARQ-ACK codebook.

It should be noted that the division of units in the embodiments of the present application is illustrative and is only a logical function division, and there may be other division modes in actual implementation. In addition, each functional unit in each embodiment of the present application may be integrated into one processing unit, or each unit may physically exist separately, or two or more units may be integrated into one unit. The above integrated unit may be realized in the form of hardware or a software functional unit.

If the integrated units are realized in the form of software functional units and are sold or used as independent products, the units may be stored in a computer readable storage medium. Based on the understandings, the technical solution of the present application may be embodied in the form of a software product essentially or the part of contributions to the prior art or all or part of the technical solution may be embodied in the form of a software product. The computer software product is stored in a storage medium and includes a plurality of instructions to enable a computer device (may be a personal computer, a server or a network device, etc.) or a processor to execute all or part of the steps of the method of all the embodiments of the present application. The above-mentioned storage medium includes a USB flash disk, a mobile hard disk, a read-only memory (ROM), a random access memory (RAM), a disk, an optical disk or various media capable of storing program codes.

An embodiment of the present application provides a computing device, which may specifically be a desktop computer, a portable computer, a smart phone, a tablet computer, a PDA and the like. The computing device may include a center processing unit (CPU), a memory, an input/output device and the like, the input device may include a keyboard, a mouse, a touch screen and the like, and the output device may include a display device, such as a liquid crystal display (LCD), a cathode ray tube (CRT) and the like.

The memory may include a ROM and a RAM, and provide program instructions and data stored in the memory to the processor. In the embodiment of the present application, the memory may be configured to store a program of any method provided by the embodiment of the present application.

The processor calls the program instructions stored in the memory, and is configured to execute any method provided by the embodiment of the present application according to the obtained program instructions.

An embodiment of the present application provides a computer storage medium, configured to store computer program instructions used by an apparatus provided by the embodiment of the present application, and the computer program instructions contain programs for executing any method provided by the embodiment of the present application.

The computer storage medium may be any available medium or data storage device accessible by a computer, including but not limited to a magnetic memory (such as a floppy disk, a hard disk, a magnetic tape, and a magneto-optical (MO) disk), an optical memory (such as CD, DVD, BD and HVD), a semiconductor memory (such as a ROM, an EPROM, an EEPROM, a nonvolatile memory (NAND FLASH), a solid state disk (SSD)) and the like.

The method provided by the embodiment of the present application may be applied to a terminal device, and may also be applied to a network device.

The terminal device may also be called user equipment (UE for short), a mobile station (MS for short), a mobile terminal and the like, optionally, the terminal may have an ability to communicate with one or more core networks via a RAN. For example, the terminal may be a mobile phone (or called "cellular" phone), or a computer with a movable property and the like, and for example, the terminal may further be a portable, pocket-size, handheld, computer built-in or vehicle-mounted moving apparatus.

The network device may be a network-side device (such as an access point), and refer to a device in an access network that communicates with a wireless terminal through one or more sectors on an air interface. The network-side device may be configured to mutually convert received air frames and IP packets, and act as a router between the wireless terminal device and the rest of the access network, wherein the rest of the access network may include an IP network. The network-side device may further coordinate attribute management of the air interface. For example, the network-side device may be a BTS in GSM or CDMA, a NodeB in WCDMA, or a NodeB or eNB or e-NodeB, and evolutional Node B in an LTE, or gNB in a 5G system and the like. These are not limited by the embodiment of the present disclosure.

The above method processing flow may be implemented by a software program, which may be stored in a storage medium, and the stored software program, when called, executes steps of the above method.

Those skilled in the art will appreciate that the embodiments of the present application may be provided as methods, systems, or computer program products. Therefore, the present application may take the form of a full hardware embodiment, a full software embodiment, or an embodiment combining software and hardware. Besides, the present application may adopt the form of a computer program product implemented on one or more computer available storage media (including but not limited to a disk memory, an optical memory and the like) containing computer available program codes.

The present application is described with reference to the flow chart and/or block diagram of the method, device (system), and computer program product according to the embodiments of the present application. It should be understood that each flow and/or block in the flow chart and/or block diagram and the combination of flows and/or blocks in the flow chart and/or block diagram can be implemented by computer program instructions. These computer program instructions can be provided to processors of a general-purpose computer, a special-purpose computer, an embedded processor or other programmable data processing devices to generate a machine, so that instructions executed by processors of a computer or other programmable data processing devices generate an apparatus for implementing the functions specified in one or more flows of the flow chart and/or one or more blocks of the block diagram.

These computer program instructions can also be stored in a computer-readable memory capable of guiding a computer or other programmable data processing devices to work in a specific manner, so that instructions stored in the computer-readable memory generate a manufacturing product including an instruction apparatus, and the instruction apparatus implements the functions specified in one or more flows of the flow chart and/or one or more blocks of the block diagram.

These computer program instructions can also be loaded on a computer or other programmable data processing devices, so that a series of operation steps are executed on the computer or other programmable devices to produce computer-implemented processing, and thus, the instructions executed on the computer or other programmable devices provide steps for implementing the functions specified in one or more flows of the flow chart and/or one or more blocks of the block diagram.

Apparently, those skilled in the art can make various modifications and variations to the present application without departing from the spirit and scope of the present application. In this way, under the condition that these modifications and variations of the present application fall within the scope of the claims of the present application and their equivalent technologies, the present application is also intended to include these modifications and variations.

What is claimed is:

1. A method for determining a feedback information transmission location, comprising:
    determining that downlink control information (DCI) indicates semi-persistent scheduling (SPS) physical downlink shared channels (PDSCHs) release on a plurality of carriers; and
    determining a target location of a hybrid automatic repeat request-acknowledge (HARQ-ACK) corresponding to the DCI in an HARQ-ACK codebook according to a start and length indicator value (SLIV) for a first SPS PDSCH among the released SPS PDSCHs, wherein the first SPS PDSCH is an SPS PDSCH on a target carrier among the plurality of carriers;
    wherein in a case that a plurality of released SPS PDSCHs exist on the target carrier, the first SPS PDSCH is an SPS PDSCH with a smallest SPS configuration index among the plurality of released SPS PDSCHs on the target carrier.

2. The method according to claim 1, wherein the target carrier comprises:
    a carrier in which the DCI is transmitted; or
    a carrier with a largest carrier index among the plurality of carriers; or
    a carrier with a smallest carrier index among the plurality of carriers; or
    each of the plurality of carriers.

3. The method according to claim 2, wherein the HARQ-ACK codebook is a semi-static HARQ-ACK codebook.

4. The method according to claim 1, wherein the determining the target location of the HARQ-ACK corresponding to the DCI in the HARQ-ACK codebook according to the SLIV for the first SPS PDSCH among the released SPS PDSCHs, further comprises:
    determining the target location of the HARQ-ACK corresponding to the DCI in the HARQ-ACK codebook according to a first time unit of the target carrier, wherein the first time unit is a first or last time unit or each time unit among time units overlapping with the DCI; or
    determining the target location of the HARQ-ACK corresponding to the DCI in the HARQ-ACK codebook according to a second time unit of the target carrier, wherein the second time unit is a first or last time unit or each time unit among time units overlapping with a time unit in which the DCI is transmitted.

5. The method according to claim 4, wherein each of the time units comprises a predefined time period, or a subframe, or a slot, or a sub-slot composed of N symbols; and N is a positive integer.

6. The method according to claim 5, wherein the HARQ-ACK codebook is a semi-static HARQ-ACK codebook.

7. The method according to claim 4, wherein the HARQ-ACK codebook is a semi-static HARQ-ACK codebook.

8. The method according to claim 1, wherein the HARQ-ACK codebook is a semi-static HARQ-ACK codebook.

9. A non-transitory computer storage medium, storing a computer program thereon, wherein the program, when executed by a processor, implements steps of the method according to claim 1.

10. A device for determining a feedback information transmission location, comprising: a processor and a memory;
    wherein the processor is configured to read a program in the memory and execute:
        determining that downlink control information (DCI) indicates semi-persistent scheduling (SPS) physical downlink shared channels (PDSCHs) release on a plurality of carriers; and
        determining a target location of a hybrid automatic repeat request-acknowledge (HARQ-ACK) corresponding to the DCI in an HARQ-ACK codebook according to a start and length indicator value (SLIV) for a first SPS PDSCH among the released SPS PDSCHs, wherein the first SPS PDSCH is an SPS PDSCH on a target carrier among the plurality of carriers;
    wherein in a case that a plurality of released SPS PDSCHs exist on the target carrier, the first SPS PDSCH is an SPS PDSCH with a smallest SPS configuration index among the plurality of released SPS PDSCHs on the target carrier.

11. The device according to claim 10, wherein the target carrier comprises:
    a carrier in which the DCI is transmitted; or
    a carrier with a largest carrier index among the plurality of carriers; or
    a carrier with a smallest carrier index among the plurality of carriers; or
    each of the plurality of carriers.

12. The device according to claim 11, wherein the HARQ-ACK codebook is a semi-static HARQ-ACK codebook.

13. The device according to claim 10, wherein the processor is further configured to:
    determine the target location of the HARQ-ACK corresponding to the DCI in the HARQ-ACK codebook according to a first time unit of the target carrier, wherein the first time unit is a first or last time unit or each time unit among time units overlapping with the DCI; or
    determine the target location of the HARQ-ACK corresponding to the DCI in the HARQ-ACK codebook according to a second time unit of the target carrier, wherein the second time unit is a first or last time unit or each time unit among time units overlapping with a time unit in which the DCI is transmitted.

14. The device according to claim 13, wherein each of the time units comprises a predefined time period, or a subframe, or a slot, or a sub-slot composed of N symbols, and N is a positive integer.

15. The device according to claim 14, wherein the HARQ-ACK codebook is a semi-static HARQ-ACK codebook.

16. The device according to claim 13, wherein the HARQ-ACK codebook is a semi-static HARQ-ACK codebook.

17. The device according to claim 10, wherein the HARQ-ACK codebook is a semi-static HARQ-ACK codebook.

* * * * *